US006702054B2

(12) United States Patent
Schneider et al.

(10) Patent No.: US 6,702,054 B2
(45) Date of Patent: Mar. 9, 2004

(54) THERMOSTAT HOUSING ASSEMBLY FOR LIQUID-COOLED MOTORCYCLE ENGINE

(75) Inventors: Andreas Schneider, Leonberg (DE); Klaus Fuoss, Balingen (DE); Stefan Fegg, Korntal-Munchingen (DE)

(73) Assignee: Harley-Davidson Motor Company Group, Inc., Milwaukee, WI (US)

( * ) Notice: Subject to any disclaimer, the term of this patent is extended or adjusted under 35 U.S.C. 154(b) by 0 days.

(21) Appl. No.: 10/027,504

(22) Filed: Dec. 20, 2001

(65) Prior Publication Data

US 2002/0195289 A1 Dec. 26, 2002

(30) Foreign Application Priority Data

Jun. 21, 2001 (DE) ......................................... 101 29 933

(51) Int. Cl.[7] ................................................ F01P 3/00
(52) U.S. Cl. .................................... 180/229; 123/41.29
(58) Field of Search ............................... 180/229, 68.4, 180/68.6; 123/41.1, 41.29, 41.08; 285/370, 397, 235

(56) References Cited

U.S. PATENT DOCUMENTS

| 3,476,413 | A | * | 11/1969 | Coberly et al. | .......... 285/332.3 |
| 4,171,729 | A | * | 10/1979 | Shibata | .......... 180/229 |
| 5,671,954 | A | * | 9/1997 | Cheramie | .......... 285/281 |
| 5,701,851 | A | * | 12/1997 | Nakano et al. | .......... 123/41.1 |
| 5,727,729 | A | * | 3/1998 | Hutchins | .......... 236/34.5 |
| 6,179,349 | B1 | * | 1/2001 | Guzzoni | .......... 285/370 |
| 6,260,515 | B1 | * | 7/2001 | Tosaka et al. | .......... 123/41.08 |
| 6,332,505 | B1 | * | 12/2001 | Tateshima et al. | .......... 180/229 |
| 6,343,573 | B1 | * | 2/2002 | Takahashi | .......... 123/41.1 |
| 6,422,182 | B1 | * | 7/2002 | Ohta | .......... 123/41.29 |
| 6,446,586 | B2 | * | 9/2002 | Fukamachi | .......... 123/41.1 |
| 6,460,492 | B1 | * | 10/2002 | Black et al. | .......... 123/41.1 |

FOREIGN PATENT DOCUMENTS

| DE | 3718743 | 11/1988 |
| EP | 0907009 | 4/1999 |

* cited by examiner

*Primary Examiner*—Lesley D. Morris
*Assistant Examiner*—Tony Winner
(74) *Attorney, Agent, or Firm*—Michael Best & Friedrich LLP

(57) ABSTRACT

A thermostat housing assembly for a motorcycle engine includes a body portion defining a cavity and an inlet port communicating with the cavity. The inlet port is configured to be directly connected to a water jacket outlet. The thermostat housing assembly further includes a return port communicating with the cavity and configured to be coupled to a return line. A thermally-responsive valve in the cavity selectively prevents and allows communication between the cavity and the return port. Preferably, the thermostat housing assembly further includes a second inlet port communicating with the cavity and configured to be directly connected to a second water jacket outlet. Further preferably, the first and second inlet ports are substantially parallel to each other and the first inlet port is longer than the second inlet port. Each inlet port includes a connector for connecting the inlet port to a water jacket outlet.

25 Claims, 3 Drawing Sheets

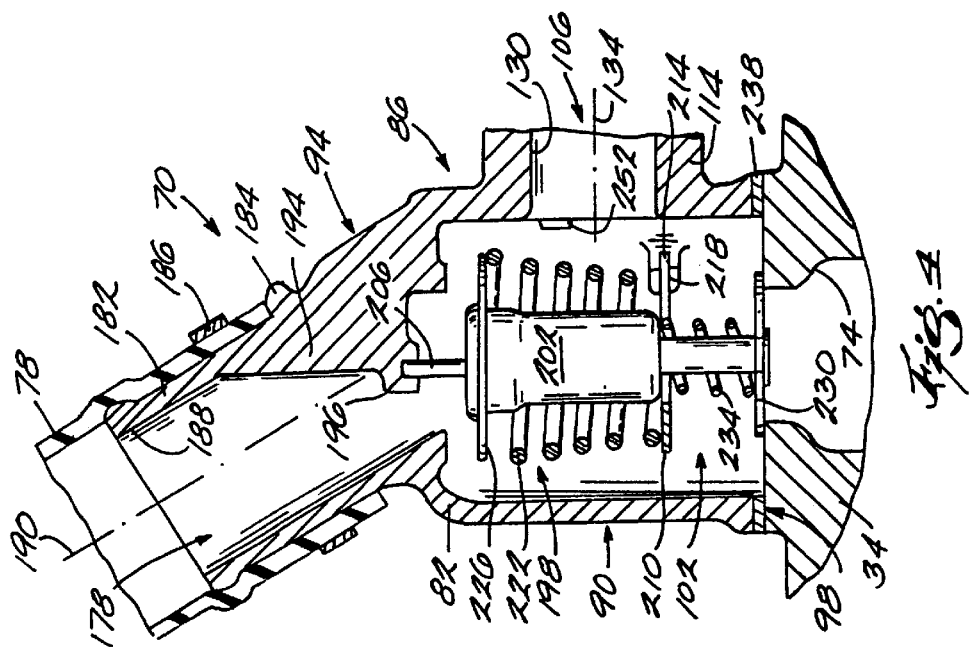

THERMOSTAT HOUSING ASSEMBLY FOR LIQUID-COOLED MOTORCYCLE ENGINE

FIELD OF THE INVENTION

The invention relates to motorcycles, and more particularly to motorcycles having liquid-cooled engines.

BACKGROUND OF THE INVENTION

Motorcycles having liquid-cooled engines are known. Typically, the liquid coolant flows in a circuit having a radiator, a pump, and a water jacket surrounding each of the engine cylinders. Liquid coolant is pumped from the outlet of the radiator to the inlet of the water jacket via a feed line. Heat generated in the cylinders is transferred to the liquid coolant in the water jacket. A return line extends between the outlet of the water jacket and the inlet of the radiator to transfer the heated liquid coolant back to the radiator, thereby removing heat from the cylinders. The heated liquid coolant circulates through the radiator and is cooled by air flowing around the radiator as the motorcycle moves.

The flow of liquid coolant in the above-described coolant circuit is controlled, in part, by a thermostat assembly that provides variable flow restriction of the coolant through the return line. The thermostat assembly includes an inlet, an outlet, and a temperature-sensitive valve positioned between the inlet and the outlet. The valve is configured to selectively allow or prevent coolant from flowing through the outlet and into the return line. When the temperature reaches a predetermined level, the valve opens, allowing heated coolant to return to the radiator.

U.S. Pat. No. 4,519,473 discloses a motorcycle having a single-cylinder liquid-cooled engine. The water jacket extends around the cylinder and forms a portion of the cylinder head. The thermostat assembly is mounted on the cylinder head adjacent the exhaust port of the water jacket.

SUMMARY OF THE INVENTION

With larger, two-cylinder liquid-cooled motorcycle engines, the design and placement of the thermostat assembly is more complicated. Two-cylinder engines have two separate water jackets, one water jacket surrounding each cylinder. The thermostat assembly must be adapted to receive coolant from both water jackets. Typically, rubber hoses are used to provide fluid communication between each of the water jackets and the thermostat assembly. Metal hose clamps are required to seal the various connections between the hoses, the water jackets, and the thermostat assembly.

The use of rubber hoses typically necessitates the remote placement of the thermostat assembly from the cylinders. Often, the two individual hoses extending from the two water jackets must first come together at a junction so that the coolant can enter the thermostat assembly via a single inlet. Significant space is needed in which to bring the two hoses together, form the necessary junction, and combine the separate coolant flows into a single stream flowing through a single hose. Because of the space requirements, the thermostat assembly is typically remote from the outlets of the water jacket, resulting in a less than compact motorcycle engine cooling system.

The present invention provides an improved thermostat housing assembly for a two-cylinder, liquid-cooled motorcycle engine. The thermostat housing assembly has a compact design that enables the thermostat housing assembly to be directly connected to the two water jacket outlets, thereby resulting in a compact engine cooling system. No rubber hoses or hose clamps are required to provide fluid communication between the water jacket outlets and the inlets of the thermostat housing assembly. Rather, the thermostat housing assembly includes two short connector tubes, one connector tube extending from each of the two thermostat housing inlets. The connector tubes are plugged directly into the respective water jacket outlets to create the necessary fluid communication lines.

The thermostat housing assembly also communicates with a passageway in the crankcase that provides a circulation path for the coolant flowing through the water jackets. When the valve is closed, coolant is pumped into and flows through the water jacket, exits the water jacket into the thermostat housing assembly, and flows back to the water jacket circuit through the passageway in the crankcase. The thermostat housing assembly is mounted directly on the crankcase, adjacent the passageway, thus further avoiding the need for rubber hoses and hose clamps.

The thermostat housing assembly can also include a temperature sensor positioned adjacent the inlet side of the valve to measure the temperature of the coolant flowing through the water jacket. The measured temperature of the coolant is relayed to the engine control unit.

With the improved thermostat housing, the installation of the coolant system is greatly facilitated. Additionally, a more compact motorcycle design is achieved.

Other features and advantages of the invention will become apparent to those skilled in the art upon review of the following detailed description, claims, and drawings.

BRIEF DESCRIPTION OF THE DRAWINGS

FIG. 3 is a section view taken along line 3—3 of FIG. 2 showing a temperature-sensitive valve in a closed position.

FIG. 4 is similar to FIG. 3 showing the temperature-sensitive valve in an open position.

Figure 1:
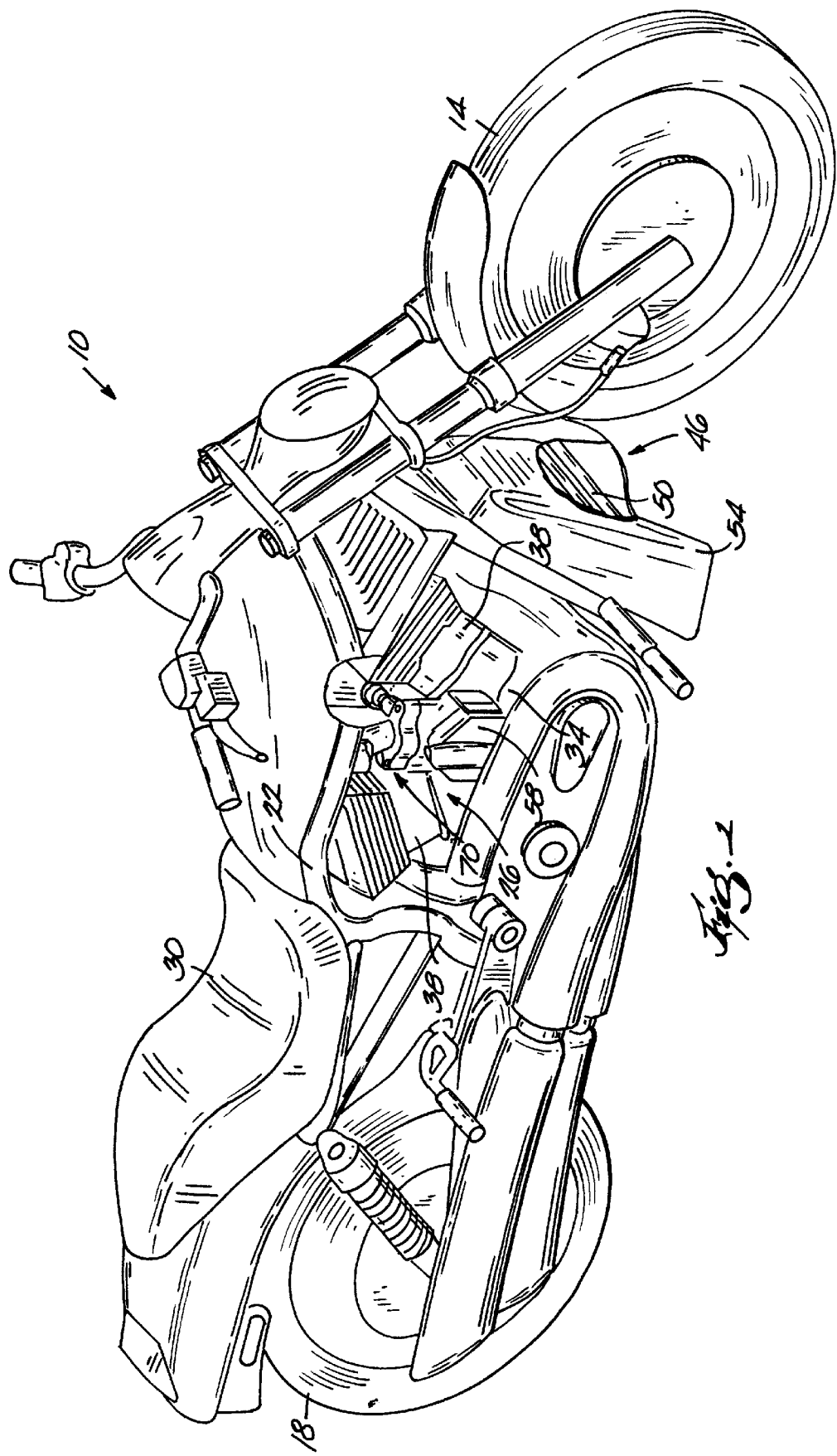
FIG. 1 is a perspective view, partially broken away, of a motorcycle having a thermostat housing assembly embodying the invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION OF THE PREFERRED EMBODIMENT

Figure 2:
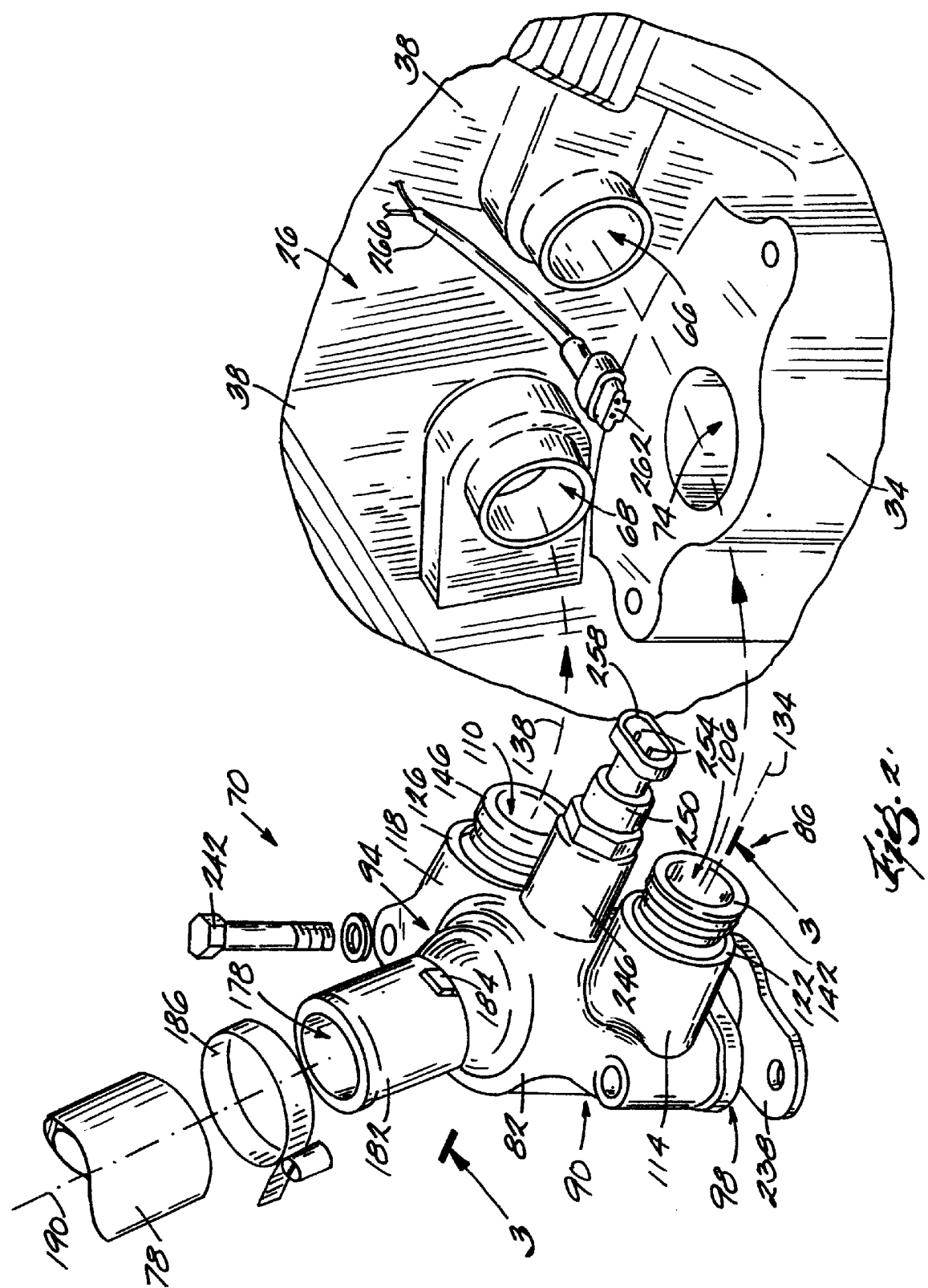
FIG. 2 is an exploded perspective view of the thermostat housing assembly and a portion of the motorcycle.

FIG. 1 illustrates a motorcycle 10 embodying the present invention. The motorcycle 10 includes a front wheel 14, a rear wheel 18, a frame 22 supported by the wheels 14 and 18, an engine 26 supported by the frame 22, and a seat 30. The engine 26 is a liquid-cooled engine having a crankcase 34 and a pair of substantially identical cylinders 38 mounted in a V-configuration on the crankcase 34. As seen in FIGS. 1 and 2, the cylinders 38 are slightly offset from one another in the lateral direction to accommodate the components of the drive train.

The motorcycle 10 also includes a cooling system coupled to the engine 26. The cooling system includes a radiator assembly 46 having a radiator 50 and a radiator cover 54. The radiator 50 functions to remove heat from liquid coolant (not shown), as is known in the art. A feedline (not shown) extends from the radiator 50 to the engine 26 to supply coolant to the engine 26. A pump 58 is mounted to the crankcase 34 and operates to circulate the coolant through the engine 26.

The coolant cools the engine 26 by removing heat from the cylinders 38. To accomplish this cooling, each cylinder 38 includes a water jacket 62 (see FIG. 3) that surrounds the cylinder. In the illustrated embodiment, each water jacket 62 includes coolant passageways 64 (only one is shown in FIG. 3) that surround the cylinder. Coolant flows through the coolant passageways 64 in the water jackets 62, and heat generated by the cylinders during operation of the engine 26 is transferred to the coolant, as is understood. Coolant is pumped into the water jackets 62 through respective inlets (not shown), circulates through the water jackets 62 to remove heat, and exits the water jackets 62 through respective outlets 66 and 68 (see FIG. 2).

The cooling system also includes a thermostat housing assembly 70 that communicates with the outlets 66, 68 and that directs the flow of coolant through the cooling system. While the details of the construction and operation of the thermostat housing assembly 70 will be described below, the basic function of the thermostat housing assembly 70 is to direct the coolant in one of two directions depending on the temperature of the coolant. If the circulating coolant is relatively cold, the thermostat housing assembly 70 directs the coolant back to the pump 58 for recirculation through the water jackets 62. A recirculation passageway 74 (see FIGS. 2–4) in the crankcase 34 communicates between the thermostat housing assembly 70 and the pump 58 to allow the cold coolant to return to the pump 58 after exiting the water jackets 62.

When the coolant has absorbed enough heat from the engine 26 to become sufficiently hot, the thermostat housing assembly 70 directs the hot coolant to the radiator 50 to be cooled. A return line 78 (see FIGS. 2–4) is connected between the thermostat housing assembly 70 and the radiator 50 to return the hot coolant to the radiator 50.

The thermostat housing assembly 70 will now be described in detail with reference to FIGS. 2–4. The thermostat housing assembly 70 includes a body portion 82 having an inward side 86, an outward side 90, a top 94 and a bottom 98. The terms "inward," "outward," "top," and "bottom" are used for purposes of description of the illustrated embodiment only. The body portion 82 defines a cavity 102 (see FIGS. 3 and 4) that is substantially open along the bottom 98.

The thermostat housing assembly 70 also includes first and second inlet ports 106 and 110, respectively. The inlet ports 106, 110 extend from the inward side 86 to connect the thermostat housing assembly 70 to the outlets 66, 68 of the water jackets 62. Each of the inlet ports 106 and 110 is defined by a tubular extension 114 and 118, respectively. Due to the lateral offset of the cylinders 38 described above, the water jacket outlets 66 and 68 are also laterally offset from one another. To accommodate this lateral offset, the extension 114 is longer than the extension 118. Of course, the offset could be reversed such that the extension 118 is longer than the extension 114. Additionally, if the cylinders 38 or the water jacket outlets 66, 68 were not offset, the extensions 114 and 118 could be the same length.

The extension 114 includes an end 122 and the extension 118 includes an end 126. Additionally, each tubular extension 114, 118 has a stepped inner wall 130 (see FIGS. 3 and 4) defining a bore that communicates with the cavity 102. Each bore has a longitudinal axis 134 and 138, respectively (see FIG. 2), extending in a first direction from the inward side 86 to the outward side 90. As seen in FIG. 2, the longitudinal axes 134 and 138 are substantially parallel to one another, and therefore, the extensions 114 and 118 are substantially parallel to one another. In the illustrated embodiment, the end 122 lies in a first plane that is substantially normal to both of the longitudinal axes 134 and 138. The end 126 lies in a second plane that is also substantially normal to both of the longitudinal axes 134 and 138. Due to the difference in length between the extensions 114 and 118, the first and second planes containing the respective ends 122 and 126 are offset from one another in the first direction.

As seen in FIG. 2, the extension 114 houses a first connector 142 and the extension 118 houses a second connector 146. The connectors 142, 146 facilitate the connection between the inlet ports 106, 110 and the water jacket outlets 66, 68. As will be described in more detail below, the connectors 142, 146 facilitate plugging or pressing the inlet ports 106, 110 directly into the water jacket outlets 66, 68, thereby eliminating the need for separate hoses and hose clamps. The connectors 142, 146 are substantially identical and only the connector 142 will be described in detail.

As seen in FIG. 3, the connector 142 is substantially tubular and includes an outer surface 150 having spaced circumferential grooves 154 and 158. The groove 154 houses an O-ring 162 and the groove 158 houses a substantially identical O-ring 166. The connector 142 is sized to be press-fit into the end 122 of the extension member 114 such that the O-ring 162 sealingly engages the inner wall 130. The connector 142 is seated in the extension 114 on a step 170 formed in the inner wall 130. Likewise, the other end of the connector 142 is sized to be press-fit into the water jacket outlet 66 such that the O-ring 166 sealingly engages an inner wall 172 of the outlet 66. The connector 142 is seated in the outlet 66 on a step 174 formed in the inner wall 172.

The connector 146 is seated in the extension 118 and the water jacket outlet 68 in substantially the same manner. Because the connectors 142 and 146 are substantially identical, they are interchangeable with one another, thereby facilitating assembly. Additionally, because the connectors 142 and 146 are substantially symmetrical, either end of the connectors 142, 146 can be inserted into the extensions 114, 118 or the outlets 66, 68. The connectors 142, 146 can be made of any suitable material, and in the illustrated embodiment, are made of nylon. If other, more resilient materials are used, it may be possible to eliminate the O-rings 162, 166.

The thermostat housing assembly 70 also includes a return port 178 extending from the top 94 to connect the thermostat housing assembly 70 to the return line 78. The return port 178 is defined by a tubular extension 182 that receives the return line 78 as shown in FIGS. 2–4. An external protrusion 184 is formed on the extension 182 to act as a stop for the return line 78. While the return line 78 is illustrated as being a hose connected by a hose clamp 186, other arrangements can also be used to connect the return line 78 and the return port 178.

The tubular extension 182 has an inner wall 188 defining a bore that communicates with the cavity 102. The bore has a longitudinal axis 190 extending in a second direction from the top 94 to the bottom 98, and angling toward the inward side 86. A web portion 194 extends from the inward side 86 of inner wall 188 and includes a receiving member 196 in the form of an upside-down, cup-shaped member. The purpose of the receiving member 196 will be described below.

The thermostat housing assembly 70 further includes a thermally-responsive valve 198 housed in the cavity 102 for selectively directing the flow of coolant through the thermostat housing assembly 70. As seen in FIGS. 3 and 4, the valve 198 includes a housing 202 that contains a thermally-responsive material (not shown), such as a wax or a polymer. The thermally-responsive material has a high coefficient of thermal expansion, and is used to selectively open and close the valve 198 at predetermined coolant temperatures.

A piston-like device engages the material within the housing 202 on one end. The other end 206 of the piston-like device extends outside of the housing 202 and is supported in the receiving member 196. As the thermally-responsive material expands and contracts inside the housing 202, the end 206 of the piston-like device moves in and out of the housing 202 (upwardly or downwardly as seen in FIGS. 3 and 4). The upward or downward motion of the end 206 moves the valve 198 between the positions shown in FIGS. 3 and 4 as will be described below.

The valve 198 also includes a mounting member 210 that retains the valve 198 in the cavity 102. The mounting member 210 includes opposing ends 214 (only one is shown in FIGS. 3 and 4) that are received in opposing mounting grooves 218 (only one is shown in FIGS. 3 and 4) on the inner wall of the cavity 102. To install the valve 198, the end 206 is placed into the receiving member 196 and the mounting member 210 is pushed toward the end 206 against the bias of a spring 222 until the opposing ends 214 can be rotated into the mounting grooves 218.

Thus, the valve 198 is held between the receiving member 196 and the mounting grooves 218. The spring 222 remains compressed between the mounting member 210 and a top flange 226. The top flange 226 is coupled to the housing 202 and is located adjacent the return port 178. A bottom flange 230 is coupled to the housing 202 and is adjacent the recirculation passageway 74. The bottom flange 230 is biased away from the housing 202 by a second spring 234. The purpose of the top and bottom flanges 226, 230 will be described below.

FIG. 3 illustrates the valve 198 in a first, closed position. In the closed position, the temperature of the coolant in the cavity 102 is not sufficiently hot enough to expand the thermally-responsive material inside the housing 202. As such, the end 206 remains mostly retracted in the housing 202 as shown. The top flange 226 is seated against the inner wall of the cavity 102 to substantially block communication between the cavity 102 and the return port 178. At the same time, the bottom flange 230 is unseated from the recirculation passageway 74 to allow the coolant in the cavity 102 to enter the passageway 74 and be recirculated through the water jackets 62.

FIG. 4 illustrates the valve 198 in a second, open position. In the open position, the temperature of the coolant in the cavity 102 has risen to be sufficiently hot enough to expand the thermally-responsive material inside the housing 202. As the thermally-responsive material expands, the end 206 of the piston-like device extends out further from the housing 202 as shown. Because the receiving member 196 is fixed with respect to the thermostat housing assembly 70, the extension of the end 206 causes the housing 202 and the top and bottom flanges 226 and 230 to move downwardly against the bias of the spring 222. This downward movement unseats the top flange 226 to provide fluid communication between the cavity 102 and the return port 178. Therefore, hot coolant passes through the return port 178 into the return line 78. Once in the return line 78, the coolant returns to the radiator 50 where it is cooled.

Still referring to FIG. 4, the same downward movement of the valve 198 also seats the bottom flange 230 against the crankcase 34 to substantially block fluid communication between the cavity 102 and the recirculation passageway 74. By blocking the recirculation passageway 74, the valve 198 directs the hot coolant in the cavity 102 back to the radiator 50 to be cooled. Of course, as hot coolant is returning to the radiator 50, cooled coolant is fed through the feedline to the pump 58 for circulation through the water jackets 62.

When the temperature of the coolant in the cavity 102 becomes sufficiently cool, the thermally-responsive material contracts and the valve 198 returns to the closed position. Of course, since the thermally-responsive material does not expand and contract instantly, the valve 198 will often be positioned somewhere between the completely open and the completely closed positions described above.

The thermostat housing assembly 70 also includes a gasket 238 that is positioned between the bottom 98 and the crankcase 34 when the thermostat housing assembly 70 is mounted on the crankcase 34. The gasket 238 substantially seals the connection between the body portion 82 and the crankcase 34 to substantially prevent the leakage of coolant from the cavity 102. Fasteners 242 (only 1 is shown in FIG. 2) are used to connect the thermostat housing assembly 70 to the crankcase 34 as shown. Of course, other fasteners can also be used.

The thermostat housing assembly 70 also includes an extension member 246 (see FIG. 2) positioned between the extension members 114 and 118 on the inward side 86. The extension member 246 is configured to receive a temperature sensor 250 having an end 252 (see FIGS. 3 and 4) that extends into the cavity 102 for measuring the temperature of the coolant inside the cavity 102. Any suitable temperature sensor can be used. Of course, the location of the temperature sensor 250 can vary.

As seen in FIG. 2, the temperature sensor 250 is threaded into the extension member 246. Leads 254 extend from the temperature sensor 250 and terminate in an electrical connector 258 that is connected to a mating electrical connector 262 on leads 266 adjacent the engine 26. The leads 266 are electrically connected to the engine control unit (ECU, not shown), which monitors the coolant temperature. Of course, other configurations and connections can be used.

Mounting the thermostat housing assembly 70 occurs as follows, however, the order of the operations can be changed where appropriate. With the valve 198 mounted in the cavity 102 as described above, the connectors 142, 146 are pressed into the respective extensions 114, 118. Next, the body portion 82 is manipulated to align the extensions 114, 118, and therefore the connectors 142, 146, with the outlets 66, 68. Once aligned, the body portion 82 is moved toward the engine 26, so that the connectors 142, 146 are pressed into the outlets 66 and 68, respectively. Of course, the connectors 142, 146 can also be inserted into the outlets 66, 68 first, such that moving the body portion 82 toward the engine 26 operates to press the connectors 142, 146 into the extensions 114 and 118, respectively.

At some point after pressing the connectors 142, 146 into the outlets 66, 68, the fasteners 242 are tightened to secure the thermostat housing assembly 70 to the crankcase 34. The gasket 238 should be in position between the bottom 98 of the body portion 82 and the crankcase 34 prior to tightening the fasteners 242. Once the thermostat housing assembly 70 is secured to the crankcase 34, the inlet ports 106, 110 are substantially prevented from disengaging the water jacket outlets 66, 68.

Next, and in no particular order, the electrical connectors 258 and 262 are connected to electrically couple the temperature sensor 250 with the ECU. Finally, the return line 78 is pressed onto the extension 182 until the end of the return line 78 abuts the protrusion 184. The hose clamp 186 is then tightened around the return line 78 and the tubular extension 182 to secure the connection. Of course, the electrical connection and the return line connection can also be made prior to securing the thermostat housing assembly 70 to the crankcase 34.

Various features of the invention are set forth in the following claims.

What is claimed is:

1. A motorcycle comprising:
    two wheels;
    a frame supported by the two wheels;
    an engine supported by the frame, the engine including two cylinders; and
    a cooling system coupled to the engine for cooling the engine, the cooling system including:
        a radiator;
        a first water jacket in one of the two cylinders and including an outlet;
        a second water jacket in the other of the two cylinders and including an outlet;
        a pump for circulating coolant through the water jackets;
        a return line providing fluid communication between the water jacket outlets and the radiator; and
        a thermostat housing assembly connected between the water jacket outlets and the return line, the thermostat housing assembly including:
            a body portion defining a cavity;
            first and second inlet ports communicating with the cavity, the first inlet port having an end connected to the first water jacket outlet and the second inlet port having and end connected to the second water jacket outlet, wherein the first and second inlet ports each include a longitudinal axis extending in a first direction, such that the longitudinal axes are substantially parallel to each other;
            a return port communicating with the cavity and having an end coupled to the return line; and
            a thermally-responsive valve in the cavity for selectively preventing and allowing coolant from flowing through the return port into the return line.

2. The motorcycle of claim 1, wherein the water jacket outlets are laterally offset from one another, and wherein the first inlet port is longer than the second inlet port to accommodate the offset water jacket outlets.

3. The motorcycle of claim 1, wherein the thermostat housing assembly further includes a temperature sensor between the first and second inlet ports for measuring the temperature of coolant inside the cavity.

4. The motorcycle of claim 1, wherein the thermostat housing assembly further includes a temperature sensor for measuring the temperature of coolant inside the cavity.

5. The motorcycle of claim 1, wherein the connector includes an O-ring that sealingly engages an inner wall of the inlet port.

6. The motorcycle of claim 1, wherein the connector includes an O-ring that sealingly engages an inner wall of the water jacket outlet.

7. The motorcycle of claim 1, wherein the engine further includes a crankcase having a passageway communicating with the water jacket, and wherein the thermostat housing assembly is mounted to the crankcase such that the passageway communicates directly with the cavity.

8. A thermostat housing assembly for a motorcycle engine, the thermostat housing assembly comprising:
    a body portion defining a cavity;
    an inlet port communicating with the cavity and having an end configured to be connected to a water jacket outlet, wherein the inlet port includes a connector in the end of the inlet port for connecting the inlet port to a water jacket outlet;
    a return port communicating with the cavity and having an end configured to be coupled to a return line;
    a thermally-responsive valve in the cavity for selectively preventing and allowing communication between the cavity and the return port; and
    a second inlet port communicating with the cavity and having and end configured to be connected to a second water jacket outlet, wherein the first and second inlet ports each include a longitudinal axis extending in a first direction, such that the longitudinal axes are substantially parallel to each other.

9. The thermostat housing assembly of claim 8, wherein the ends of the first and second inlet ports lie in respective first and second planes, the first and second planes being offset from one another in the first direction.

10. The thermostat housing assembly of claim 8, wherein the first inlet port is longer than the second inlet port to accommodate offset water jacket outlets.

11. The thermostat housing assembly of claim 8, wherein the thermostat housing assembly further includes a temperature sensor between the first and second inlet ports for measuring the temperature of coolant inside the cavity.

12. The thermostat housing assembly of claim 8, further including a temperature sensor for measuring the temperature of coolant inside the cavity.

13. The thermostat housing assembly of claim 8, wherein the connector includes an O-ring that sealingly engages an inner wall of the inlet port.

14. The thermostat housing assembly of claim 8, wherein the connector includes an O-ring that sealingly engages an inner wall of the water jacket outlet.

15. A motorcycle comprising:
    two wheels;
    a frame supported by the two wheels;
    an engine supported by the frame, the engine having a cylinder; and
    a cooling system coupled to the engine for cooling the engine, the cooling system including:
        a radiator;
        a water jacket in the cylinder and including an outlet;
        a pump for circulating coolant through the water jacket;
        a return line providing fluid communication between the water jacket outlet and the radiator; and
        a thermostat housing assembly connected between the water jacket outlet and the return line, the thermostat housing assembly including:
            a body portion defining a cavity;
            a temperature sensor for measuring the temperature of coolant inside the cavity;
            an inlet port communicating with the cavity and having an end connected to the water jacket outlet;

a return port communicating with the cavity and having an end coupled to the return line; and a thermally-responsive valve in the cavity for selectively preventing and allowing coolant from flowing through the return port into the return line.

16. A motorcycle comprising:

two wheels;

a frame supported by the two wheels;

an engine supported by the frame, the engine having a cylinder and a crankcase; and a cooling system coupled to the engine for cooling the engine, the cooling system including:

a radiator;

a water jacket in the cylinder and including an outlet;

a pump for circulating coolant through the water jacket;

a return line providing fluid communication between the water jacket outlet and the radiator; and a thermostat housing assembly connected between the water jacket outlet and the return line, the thermostat housing assembly including:

a body portion defining a cavity;

an inlet port communicating with the cavity and having an end connected to the water jacket outlet;

a return port communicating with the cavity and having an end coupled to the return line; and a thermally-responsive valve in the cavity for selectively preventing and allowing coolant from flowing through the return port into the return line, wherein the crankcase includes a passageway communicating with the water jacket, and wherein the thermostat housing assembly is mounted to the crankcase such that the passageway communicates directly with the cavity.

17. A thermostat housing assembly for a motorcycle engine, the thermostat housing assembly comprising:

a body portion defining a cavity;

an inlet port communicating with the cavity and having an end configured to be connected to a water jacket outlet;

a second inlet port communicating with the cavity and having and end configured to be connected to a second water jacket outlet;

a return port communicating with the cavity and having an end configured to be coupled to a return line; and a thermally-responsive valve in the cavity for selectively preventing and allowing communication between the cavity and the return port, wherein the ends of the first and second inlet ports lie in respective first and second planes, the first and second planes being offset from one another.

18. A thermostat housing assembly for a motorcycle engine, the thermostat housing assembly comprising:

a body portion defining a cavity;

a temperature sensor for measuring the temperature of coolant inside the cavity;

an inlet port communicating with the cavity and having an end configured to be connected to a water jacket outlet;

a return port communicating with the cavity and having an end configured to be coupled to a return line; and a thermally-responsive valve in the cavity for selectively preventing and allowing communication between the cavity and the return port.

19. A method of mounting a thermostat housing assembly to a motorcycle engine, the method comprising:

aligning an inlet port of the thermostat housing assembly with a water jacket outlet on the motorcycle engine;

connecting a temperature sensor that is coupled to the thermostat housing assembly to an electrical connector adjacent the motorcycle engine;

inserting a portion of the inlet port into the water jacket outlet to establish fluid communication between the motorcycle engine and the thermostat housing assembly;

securing the thermostat housing assembly to a portion of the motorcycle engine; and connecting a return line to a return port of the thermostat housing assembly.

20. A method of mounting a thermostat housing assembly to a motorcycle engine, the method comprising:

aligning an inlet port of the thermostat housing assembly with a water jacket outlet on the motorcycle engine;

inserting a portion of the inlet port into the water jacket outlet to establish fluid communication between the motorcycle engine and the thermostat housing assembly;

securing the thermostat housing assembly to a portion of the motorcycle engine, wherein securing the thermostat housing assembly to a portion of the motorcycle engine includes securing the thermostat housing assembly to a crankcase; and connecting a return line to a return port of the thermostat housing assembly.

21. The method of claim 20, further including:

connecting a temperature sensor that is coupled to the thermostat housing assembly to an electrical connector adjacent the motorcycle engine.

22. The method of claim 20, wherein inserting a portion of the inlet port into the water jacket outlet includes pressing a connector into the water jacket outlet.

23. The method of claim 20, further including:

aligning a second inlet port of the thermostat housing assembly with a second water jacket outlet on the motorcycle engine; and inserting a portion of the second inlet port into the second water jacket outlet to establish fluid communication between the motorcycle engine and the thermostat housing assembly.

24. The method of claim 23, wherein the second inlet port includes a connector extending therefrom, and wherein inserting a portion of the second inlet port into the second water jacket outlet includes pressing the connector into the second water jacket outlet.

25. The method of claim 23, wherein the second water jacket outlet includes a connector extending therefrom, and wherein inserting a portion of the second inlet port into the second water jacket outlet includes pressing the second inlet port onto the connector.

* * * * *